(12) United States Patent
Hoppes et al.

(10) Patent No.: US 7,010,375 B2
(45) Date of Patent: Mar. 7, 2006

(54) INFINITELY VARIABLE, ORDER SPECIFIC, HOLISTIC ASSEMBLY PROCESS CONTROL SYSTEM

(75) Inventors: Vern Richard Hoppes, Waterloo, IA (US); Larry Linn Kriener, Waterloo, IA (US); Matthew Jon Pipho, Waterloo, IA (US); Joshua Mark Edgin, Cedar Falls, IA (US); James Anthony Mitchell, Waterloo, IA (US); Ibrahim Hussein Shehata, Cedar Falls, IA (US); Anthony Nate Rath, Cedar Falls, IA (US); Robert Joseph Mills, Cedar Falls, IA (US); Michael Eugene Osborn, Sumner, IA (US); Mark Douglas Smith, Cedar Falls, IA (US); Terry John Phillips, Waterloo, IA (US); Kevin Dean Bortolazzo, Cedar Falls, IA (US); Dave Anthony Sink, Waterloo, IA (US); Joel Floyd Myers, Hudson, IA (US); Kenneth John Kresser, Evansdale, IA (US); Gary Lee Miner, Cedar Falls, IA (US); Lesley Ann McNaught, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/143,211

(22) Filed: Jun. 2, 2005

(65) Prior Publication Data

US 2005/0222703 A1 Oct. 6, 2005

Related U.S. Application Data

(62) Division of application No. 10/767,799, filed on Jan. 29, 2004.

(60) Provisional application No. 60/444,416, filed on Feb. 3, 2003.

(51) Int. Cl.
*G06F 19/00* (2006.01)
(52) U.S. Cl. .......................... 700/109; 700/95; 702/84
(58) Field of Classification Search .................. 700/1, 700/28, 83, 90, 95, 106–109; 702/81, 84
See application file for complete search history.

(56) References Cited

U.S. PATENT DOCUMENTS

| 5,440,478 | A | * | 8/1995 | Fisher et al. ................ 700/109 |
|---|---|---|---|---|
| 6,161,101 | A | * | 12/2000 | Guinta et al. ................. 706/45 |
| 6,453,209 | B1 | * | 9/2002 | Hill et al. ..................... 700/95 |
| 2003/0208418 | A1 | * | 11/2003 | Caputo et al. ............... 705/28 |
| 2004/0158338 | A1 | * | 8/2004 | Mammoser et al. .......... 700/96 |
| 2004/0256718 | A1 | * | 12/2004 | Chandler et al. ........... 257/704 |
| 2005/0021314 | A1 | * | 1/2005 | Rose et al. ..................... 703/1 |

* cited by examiner

*Primary Examiner*—Jayprakash N. Gandhi

(57) ABSTRACT

Interfaces are provided which integrate mistake-proofing concepts in a way easily understandable by the operator and easily configured by a manufacturing engineer. As mistake-proofing concepts are developed tables are populated and associated with specific assembly processes. Sensors are employed to monitor parts selection and tool usage. Sensors used for tool use and parts selection, error messages and actions to be performed or monitored are all defined and related in the tables and in turn to specific assembly orders. The tables are also populated with logic pointers, which are referenced by a Process Logic Control (PLC) unit that has been programmed to recall and carry out infinitely variable monitoring or control of the assembly process. For example when a particular order has been identified to the PLC by way of a scanned barcode or other means, a bill of material and assembly sequence is provided to the operator by appropriate means such as a CRT monitor. Parts bins and assembly points may be indicated by visual or other means to indicate parts and tools to be used and assembly points. Sensors determine when the proper part has been selected for the particular assembly step and/or whether the appro-

FIG. 5 priate tool is used. The PLC then provides feedback to the operator to indicate whether all necessary steps have been accomplished in the proper order, with the proper parts using the proper tools. The PLC will provide the operator with understandable error messages indicating when a step has been improperly completed. The PLC can also control stops on the line to prevent the assembly from moving forward until all steps have been completed according to the specific order program. An override means may also be provided to bypass the PLC controls in which case an error log is compiled and an automated message is sent to supervisory personnel indicating that the system was overridden by the operator and follow up action is required.

1 Claim, 10 Drawing Sheets

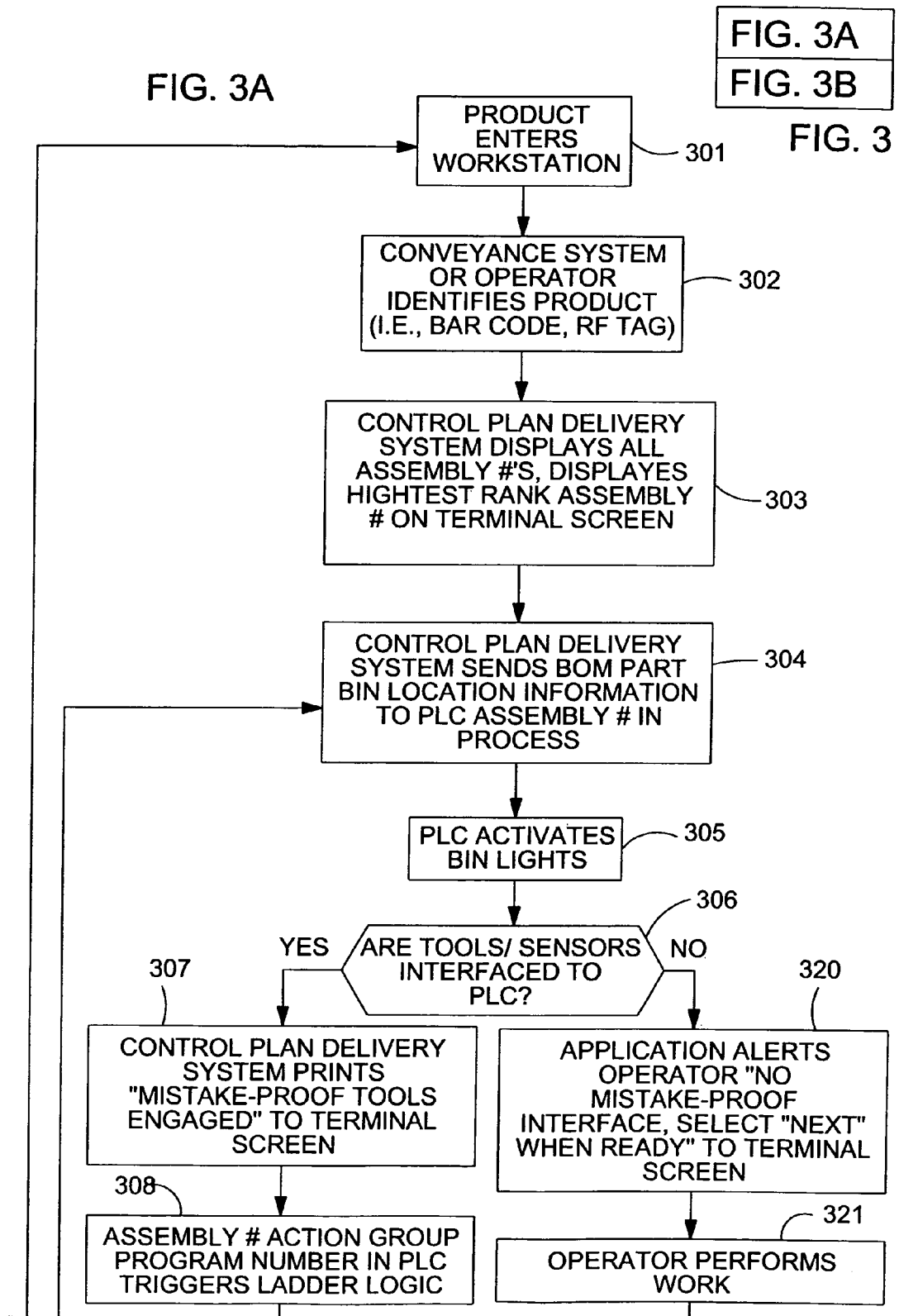

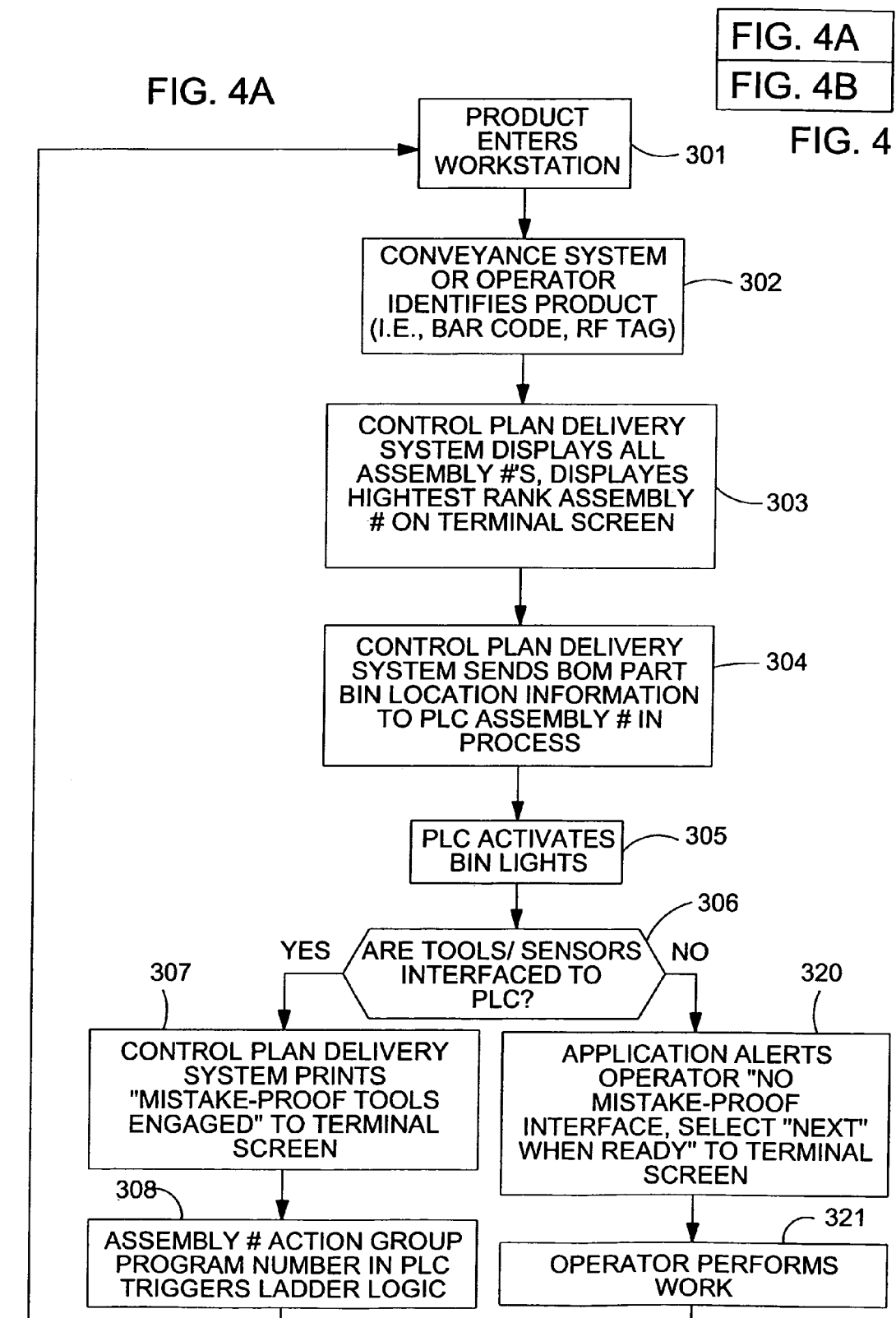

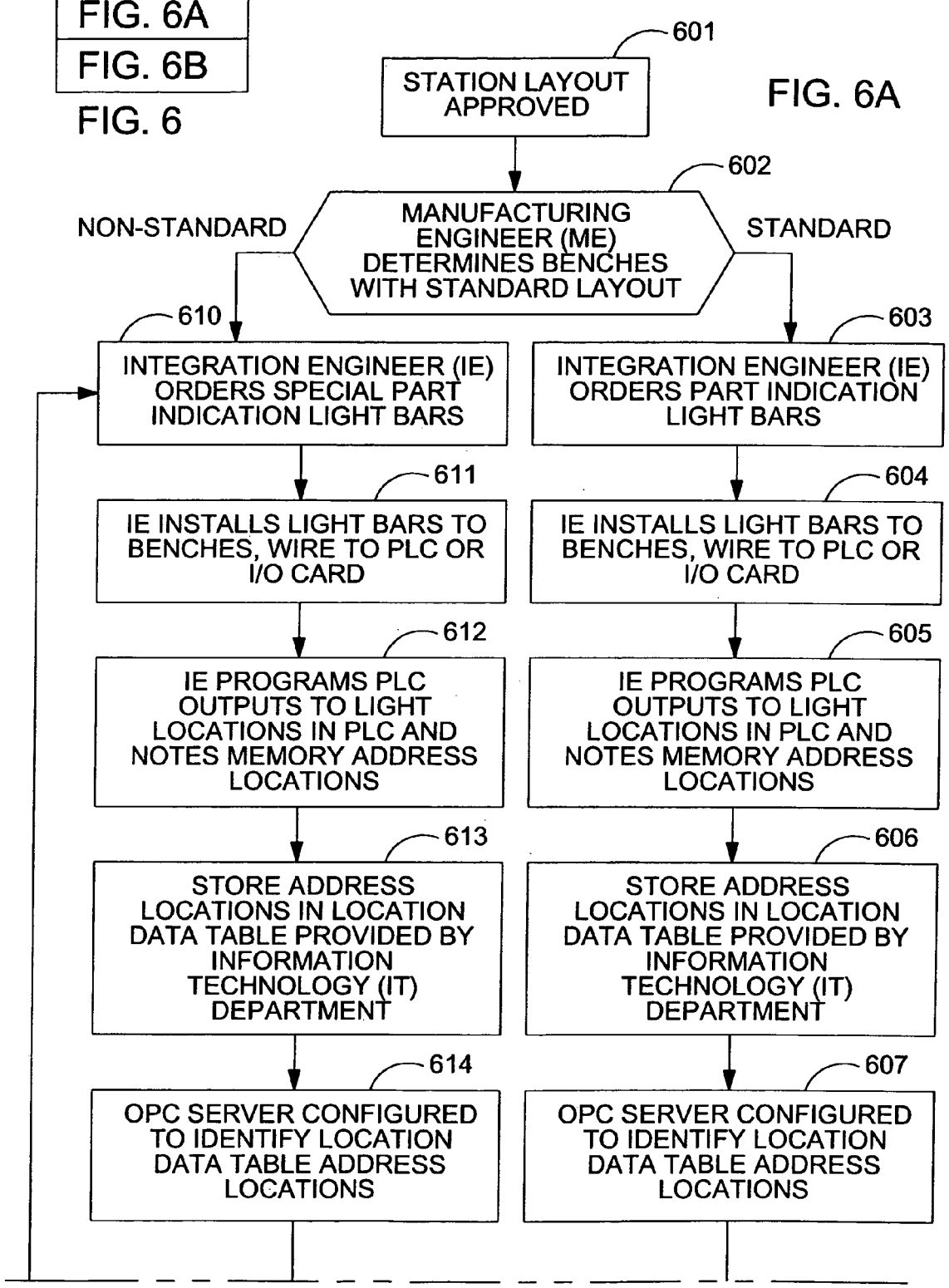

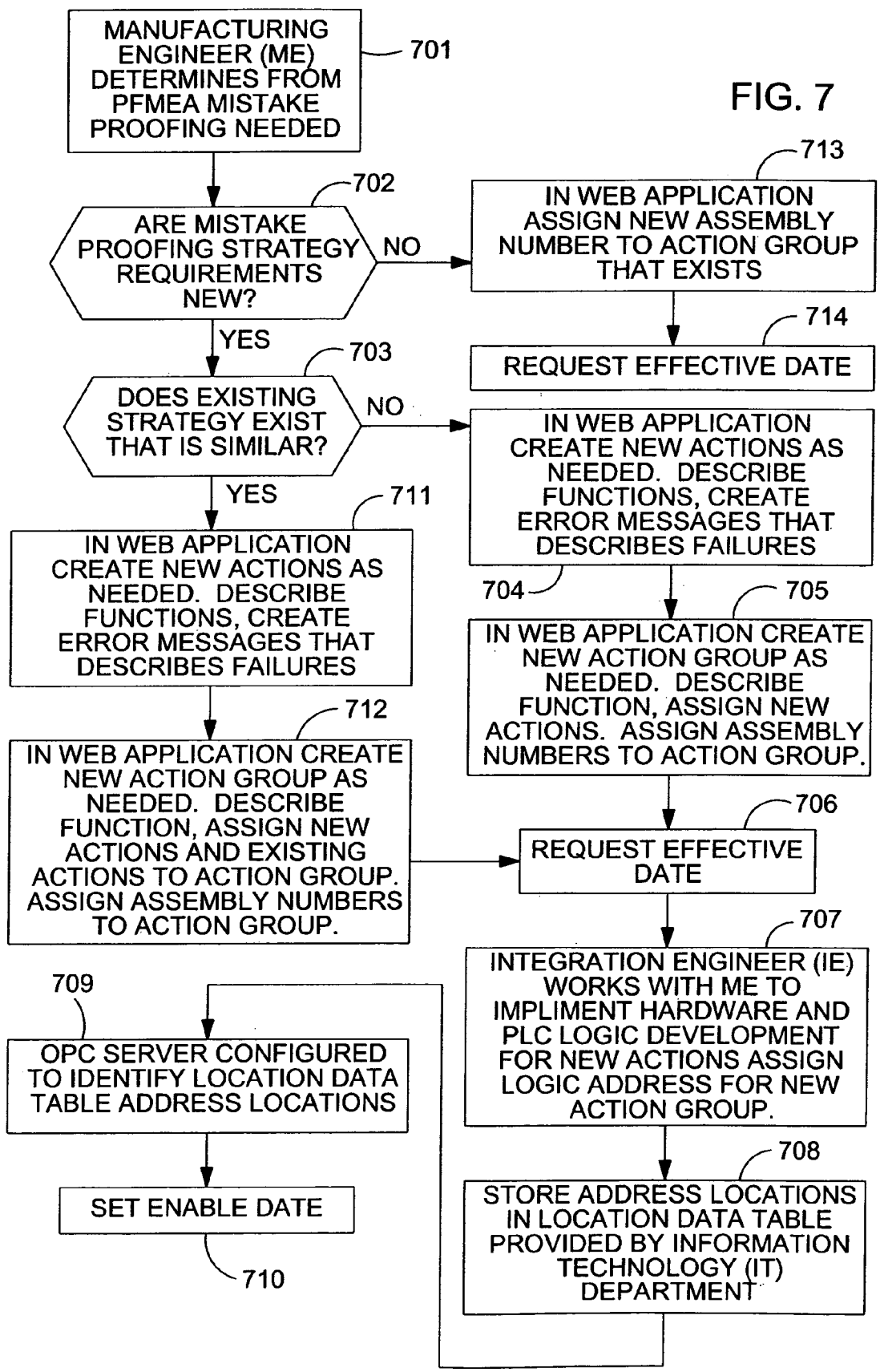

INFINITELY VARIABLE, ORDER SPECIFIC, HOLISTIC ASSEMBLY PROCESS CONTROL SYSTEM

CROSS-REFERENCE TO RELATED APPLICATION

This application is a division of applicant's co-pending application U.S. Ser. No. 10/767,799, filed 29 Jan. 2004 and titled INFINITELY VARIABLE, ORDER SPECIFIC, HOLISTIC ASSEMBLY PROCESS CONTROL SYSTEM, which application is pending. This application claims priority under 35 USC § 119(e) from U.S. Provisional Application Ser. No. 60/444,416 filed Feb. 3, 2003 under 35 USC § 111 (b).

FIELD OF THE INVENTION

The present invention relates generally to computer implemented manufacturing systems. More particularly, the present invention relates to computer integrated manufacturing workstations wherein production and assembly of parts are monitored. Specifically, the present invention relates to an infinitely variable, order specific, mistake-proofing system for ensuring quality in a production or assembly environment.

BACKGROUND OF THE INVENTION

While the use of automated production and assembly systems in product manufacturing is well known, such work is still predominately accomplished manually by human operators. In a typical manufacturing facility, one or more operators may be required to build one or more assemblies using a number of tools, steps and component parts. Such operations are subject to a number of opportunities for error i.e. omission of required parts, use of the wrong assembly tool, use of the wrong part in a particular location, incorrect torque, etc. These problems are only compounded in facilities where numerous models or variations of parts are assembled on the same line. Such errors or defects, if left undiscovered result in recalls, rejections by customers or returns or warranty claims by end users, all causing a great deal of expense for the manufacturer, distributor and dealer, and a general dissatisfaction among end users. The flowchart of FIG. 1 illustrates a typical assembly process as may be used in a product manufacturing facility. At 101 a product enters a workstation. At 102 the operator identifies the particular product model from a paper schedule. At 103 the operator identifies the work to be performed for the particular product model from a paper subschedule document. The operator then performs the required work from the subschedule document at 104. When the operator determines that all required work has been completed, the operator at 105 moves the product to the next workstation. At this point 106 no means are in place to confirm whether all required work has been performed. Thus the product is moved down the line with all required work having been completed or without all required work having been completed, resulting in a good product at 108 in the first instance or a defective product at 107 in the second instance. In either instance the product is passed down the line and the operator starts the process over on the next product at 109. Accordingly, an unacceptable percentage of products are passed down the line without all assembly steps having been completed. In some cases the defect is discovered at subsequent workstations and is later remedied, but in some cases the product makes it all the way to the end user before the defect is discovered.

Thus, in recent years a concerted effort has been made by many manufacturers to improve quality and reduce manufacturing errors or defects. The effort to improve the quality of products and attain cost savings by the manufacture of products without error is a continuous goal. A number of efforts to attain these goals have been attempted in the past. However, in the assembly process the human factor is difficult to include in a mistake-proofing system. Numerous tools and techniques have been developed to aid in controlling the assembly process, but attempts to date have only been capable of monitoring single product configurations or are so expensive and complicated to configure, deploy and sustain that they are virtually impractical. Some of these efforts do well to transfer design knowledge and make it accessible to manufacturing operators, yet stop short of the actual control of the manufacturing process. Other initiatives combine instructional information and testing with process reporting. These are limited to not allowing the display of the next instruction set and instructions are specific to each product. This strategy is good, but in a manufacturing situation where an assembly line has significant variability in product configuration, it is not manageable. Other known efforts incorporate a variety of sensing devices into the monitoring of a machining process. In this approach, the machine is pre-programmed and the variability of human actions do not come into play, and the resultant corrections of machine function to correct a sensed error must be programmed as well. Still other approaches go to considerable effort to assure that the correct part combinations in a significantly variable assembly process are available and managed. While these approaches do much toward always knowing where a product is in the assembly process and that the components are available and accounted for, they do not go beyond this component matching, and tracking strategy to improve quality. In order to be practical, mistake-proofing must be order specific at the component level and must be adaptable to mixed model production scenarios. First and foremost the human factor must be assured.

As such, there is a clear need in the art for a holistic, order specific mistake-proofing system for assembly operations which is infinitely variable and adaptable to a variety of manufacturing scenarios, while addressing the human factor. Without the mistake-proofing method described below, the number of methods, tools, and options for mistake-proofing are limited by a variety of typical assembly process complications that limit what methods can be used to solve individual process or part verification techniques. Such things as product option configurations, mixed model production, and cycle time at a given assembly station make previous solutions impractical.

SUMMARY OF THE INVENTION

To be successful in the creation of an effective yet holistic mistake-proofing method that is flexible enough to be utilized for all manner of production situations and product variability encountered in manufacturing, it is necessary to integrate source data to minimize the error risk of data duplication. It is thus necessary to design a solution to utilize any and all configurations to minimize maintenance. The creation of standardized approaches can greatly simplify the complexity and drive implementation savings through the economy of scale. The human interface needs to utilize technology to allow for a system to automate and eliminate the interaction of the individual required in as many ways as possible. The method needs to provide for closed loop processes, and the notification of errors in clear, concise recognizable language when errors do occur. The system for monitoring assembly processes needs to be an open architecture design to accommodate any currently available sensing device and also future devices not yet available. The assembly process mistake-proofing strategy needs to prevent further movement of the product along the assembly line until sensed errors are corrected, and if not correctable, reported, so product disposition can be resolved.

In view of the foregoing, it is an object of the invention to provide an integrated assembly process monitoring and mistake-proofing system.

Another object of the invention is the provision of an integrated assembly process monitoring and mistake-proofing system that is order specific for mixed model assembly scenarios.

A further object of the invention is to provide an integrated assembly process monitoring and mistake-proofing system that is holistic and infinitely variable.

An additional object of the invention is the provision of an integrated assembly process monitoring and mistake-proofing system that takes into account the human factor and ensures proper assembly of parts by way of easy to use non-intrusive operator interface.

In the approach taken by the present invention, current typical manufacturing practices and process analysis methods are used to develop the product structure, product specifications, assembly processes, and quality controls. All of this data is stored in locations typical of many manufacturing operations. One of these steps is a Process Failure Mode and Effects Analysis (PFMEA). The result of a PFMEA for a given assembly station is referred to as Risk Priority Number (RPN). The purpose of this method and the value of the RPN result is to identify assembly processes that are not adequately controlled enough to assure a process that will deliver the highest expected levels of quality during the production process. All product processes for the given production assembly station are evaluated so that a strategy to address the identified shortcomings. Once the critical processes are identified and a strategy developed, the Manufacturing Engineer (ME) assures that assembly station layout, tool locations, and part locations are defined, labeled for clarity and maintained. This is important not just for system development, but it is a good manufacturing practice in general. Once this effort is completed the configuration of the assembly station for mistake proofing can begin. Facilities Engineering, a.k.a. Integration Engineers (IE), order necessary part indication hardware, Process Logic Controls (PLC's) or expand existing PLC capability to accommodate part indicator lights for part locations called out by the ME assembly station layout. These components are installed and wired to the PLC and logic for their control is configured and logged in with necessary data locations pre-defined. This method allows for standardization of a part indication configuration and enables a very simple interface for ME to setup and maintain part indications. As soon as ME has defined the part locations, and the PLC is enabled, the Control Plan Delivery System will adapt product Bill of Material (BOM) information to indicate parts used for the given product being assembled at the assembly station based on the order identified in that station at that time. A number of methods to identify work at a given station can be utilized. At a launch station in a given assembly zone, a barcode scan of a serial number can be utilized, then the completion of that product can transfer the serial number data to next station or another subassembly line upon completion, so as to act as a queue for work to be assembled in a set order. A product tracking system may also be utilized to develop and deliver this work queue of serial numbers for a given zone. In the development of product structure, assemblies that are combining component parts to make up a given order are assigned to the assembly station where the work will be preformed. A given serial number will combine these assembly numbers at a given station, and in turn define the order specific components required for that serial number, at that station, with the current specifications for that day's build. For a given assembly, a single component, a combination of components, a single process, or combination of processes or all components and processes, may have been identified as high risk, during PFMEA analysis. To address this infinitely variable combination of component parts, and process risk abatement, a unique approach is defined by the present invention. A definition of specific actions to address and individual process risks is defined by ME. Each action can be designed to look for a sensor state change, a count of sensor state changes, and/or trigger any combination of logic events which have been pre-programmed into PLC logic. The action configuration is infinite by design. Once the action is defined, an appropriate understandable error message is also described for the Control Plan Delivery System to display to the operator so that he or she is aware that a specific action has failed. The definition of these actions is sent to IE and a requested affectivity date established. The IE purchases appropriate hardware and installs and programs logic in the PLC. The IE then stores the information as required. In most typical production operations, a given assembly process requires that multiple actions be monitored to assure quality. To avoid redundant work, the actions defined above can be re-assigned and combined to address variations of one assembly to another where, for example, the only difference may be locations of individual parts. To simplify and reduce effort, the ME is given a means to simply select any combination of defined actions into an action group. Once the action group is described and affectivity date logged, it is then related to an assembly number. Another method to reduce maintenance and workload is utilized wherein an Action group is applicable to many assembly numbers in a given station, here the Action Groups can be associated to multiple assemblies. The definition of these Action Groups is sent to IE and a requested effectivity date established. The IE programs logic in the PLC. The IE then stores the information as required for the system. The system is thus capable of a holistic approach which can address infinitely variable and/or order specific sequences; with the ability to monitor any critical assembly process, trigger any number of actions and processes if a process is in error, or allow the release of the product to the next assembly station if process was within the control defined.

The foregoing and other objects of the invention together with the advantages thereof over the known art, which will become apparent from the detailed specification which follows are attained by a system which utilizes existing and proven technologies in a new way. Interfaces are provided which integrate mistake-proofing concepts in a way easily understandable by the operator and easily configured by a manufacturing engineer. As mistake-proofing concepts are developed, tables are populated and associated with specific assembly processes. Sensors are employed to monitor parts selection and tool usage. Sensors used for tool use and parts selection, error messages and actions to be performed or monitored are all defined and related in the tables and in turn to specific assembly orders. The tables are also populated with logic pointers, which are referenced by a Process Logic Control (PLC) unit that has been programmed to recall and carry out infinitely variable monitoring or control of the assembly process. For example, when a particular order has been identified to the PLC by way of a scanned barcode or other means, a bill of material and assembly sequence is provided to the operator by appropriate means such as a CRT monitor. Parts bins and assembly points may be indicated by visual or other means to indicate parts and tools to be used and assembly points. Sensors determine when the proper part has been selected for the particular assembly step and/or whether the appropriate tool is used. The PLC then provides feedback to the operator to indicate whether all necessary steps have been accomplished in the proper order, with the proper parts using the proper tools. The PLC will provide the operator with understandable error messages indicating when a step has been improperly completed. The PLC can also control stops on the line to prevent the assembly from moving forward until all steps have been completed according to the specific order program. An override means may also be provided to bypass the PLC controls in which case an error log is compiled and an automated message is sent to supervisory personnel indicating that the system was overridden by the operator and follow up action is required.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention, reference should be made to the following detailed description and accompanying drawings, wherein.

DESCRIPTION OF THE PREFERRED EMBODIMENT

Figure 1:
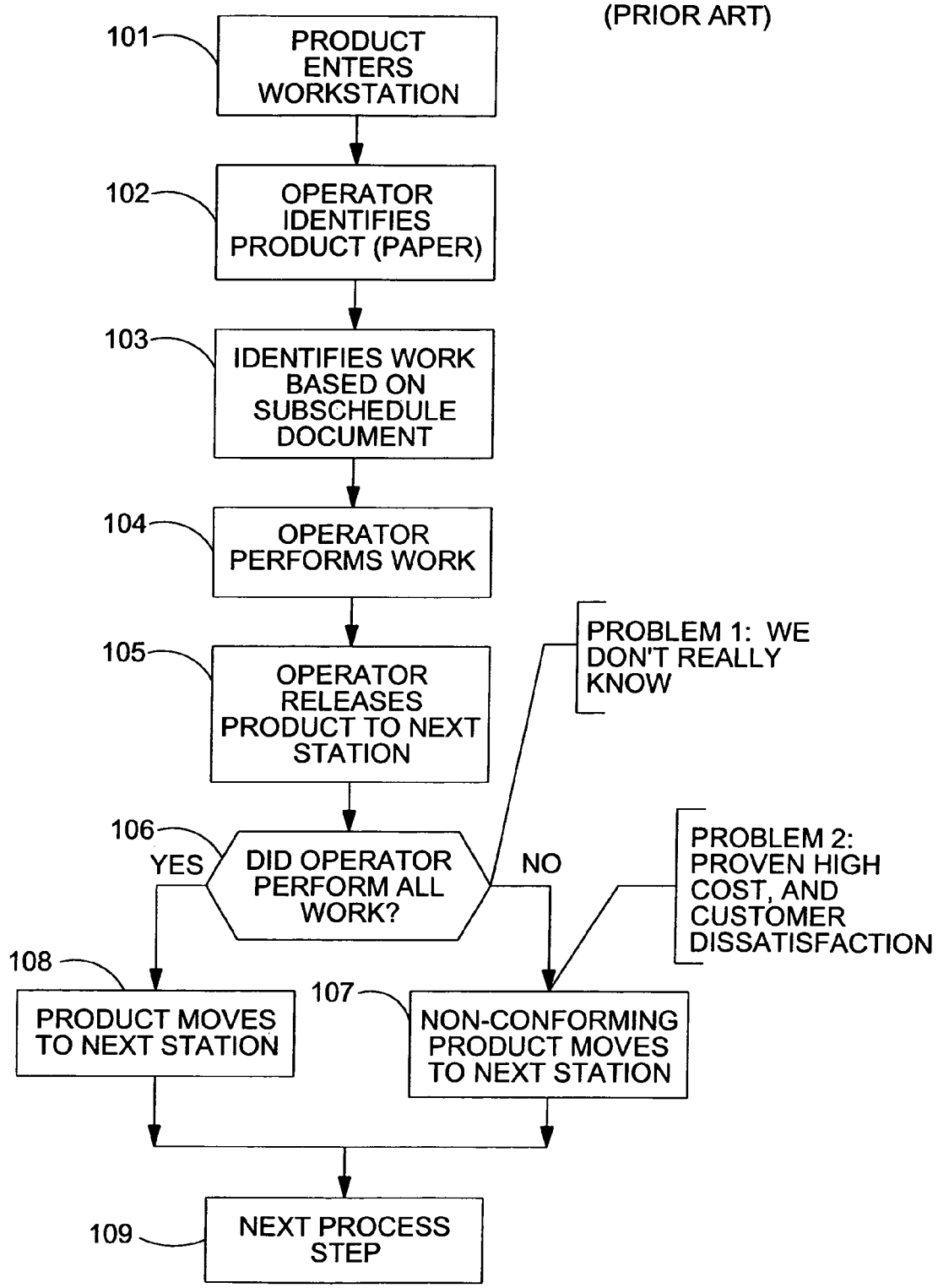
FIG. 1 is a flowchart showing a representative prior art assembly process without mistake-proofing.
Figure 2:
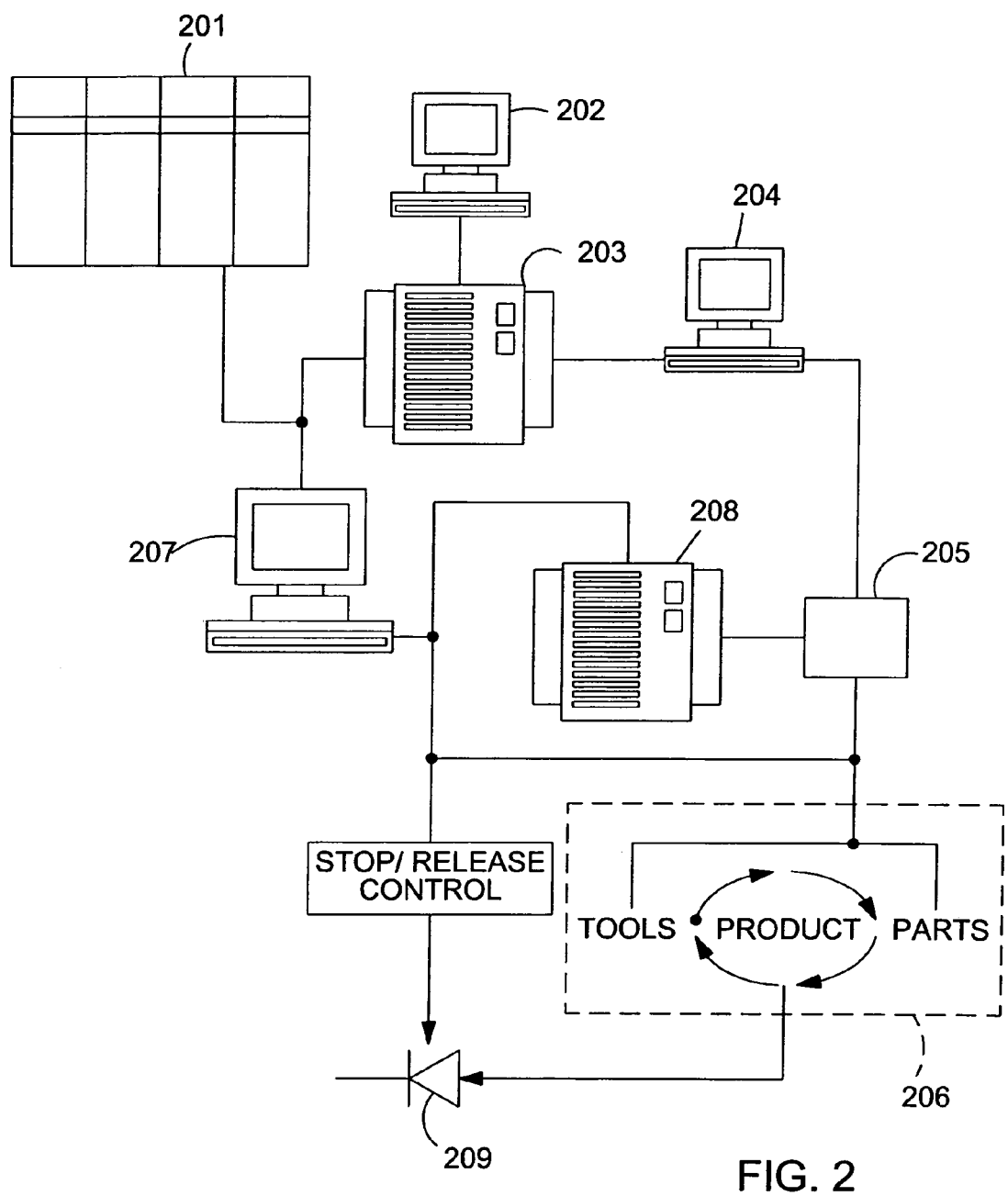
FIG. 2 is a schematic diagram showing the networked data processing system according to the invention.

Referring first to FIG. 2 it will be seen that the invention of the present application is implemented using a networked data processing system. A mainframe server 201 is provided, containing all current product specifications including product bills of material (BOM), tooling, time standards and order configurations. Manufacturing engineering personnel enter data via a terminal at 202 into an operations data server at 203. This data includes assignment of assemblies to operations and defines part/bench locations. Action definitions (specific sensors or PLC action) are also entered, along with error messages to be displayed if an action fails. Actions are collected and assembled into action groups, which are in turn related to assemblies. Visual aids for assembly operations may be provided and related to specific assemblies. At 204 Systems Integration personnel create PLC logic, tag names, and program IDs based upon the definitions previously provided by manufacturing engineering personnel. This information is loaded into the PLC at 205 along with appropriate information to trigger logic provided in operation data tables, which in turn trigger functions based upon specific assembly configuration requirements. The PLC is in communication with sensors provided at the workstation 206. The sensors may be used to indicate and detect parts selection, tool usage, line or part orientation etc. The PLC is also preferably linked to electromechanical stops to prevent a part from leaving the workstation until all necessary assembly steps have been completed. A terminal or PC is provided at 207 and is physically located near the workstation. The PC (207) is in communication with the operations data server (203) to retrieve the operation specific data relating to the specific operations for the particular workstation. The PC (207) then utilizes the information from the operations data server (203) to retrieve source data relating to BOM, tooling, order configuration, etc., from the host server (201). A visual display is then provided to the operator indicating BOM, assembly sequence and instructions along with visual aids, if appropriate. The PC at 207 is also in communication with the PLC (205) via an OPC server at 208. The OPC (object linking and embedding for process control) allows the PC at 207 to communicate with the PLC at 205. As the operator completes steps in the assembly process the sensors at 206 are triggered to indicate to the PLC (205) that particular parts have been selected and particular tools have been used. Parts indicators such as lights may be provided in parts bins, indicate which parts are to be selected and the PLC (205) can trigger the light to go out once the part has been correctly selected. When the operator concludes that all necessary assembly steps have been completed, the operator sends a "Next" message from terminal 207 via the OPC server (208) to the PLC (205), which returns a logic code to, the terminal 207. The logic code will indicate whether all necessary steps have been completed and if not, which steps were not completed properly. The PC (207) then interprets the logic code and displays appropriate error messages to the operator indicating which steps were not completed properly. This allows the operator to remedy the defect. Conversely, if all necessary steps were completed properly the PLC (205) will release the electromechanical stops at 209 to allow the part to be sent to the next workstation.

Figure 3B:
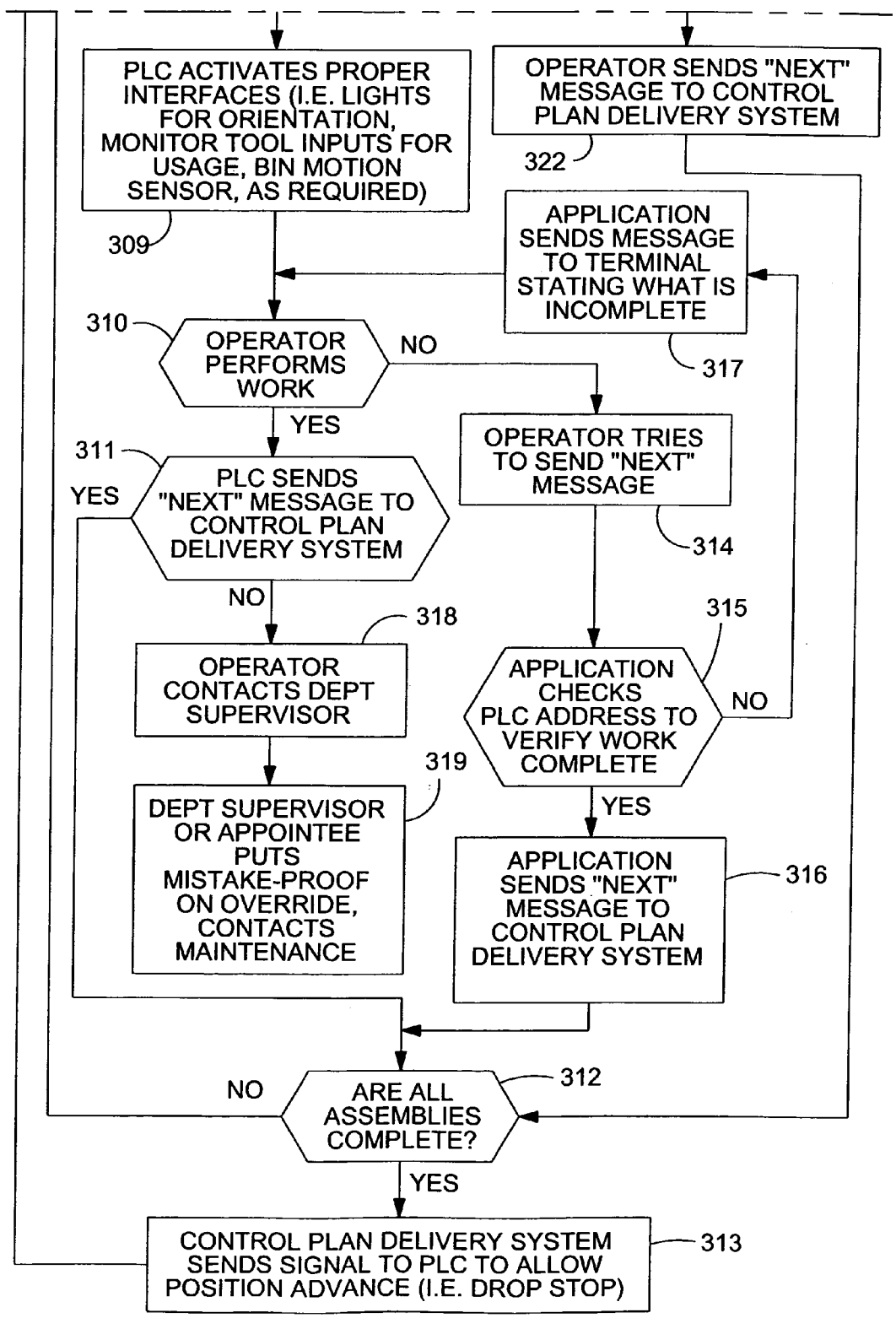
FIG. 3 is a flowchart showing the process for utilizing the invention in a sequential assembly process (work has to be done in a defined sequence of events)

An assembly workstation sequential mistake-proofing process according to the invention is shown in FIG. 3. At 301 a base part enters the workstation. At 302 the conveyance system or operator uses appropriate means to identify the base part to the system. Identification may be made by means of a scanned barcode, RF tag, entry of an identifier or other appropriate means. At 303 the system then uses the ID information to retrieve and display all assembly specific information necessary for the operator to begin working on the assembly. Steps are ranked according to assembly sequence. The system then sends BOM part bin location information to the PLC for the specifically identified assembly at 304. The PLC then activates appropriate parts bin indicators at 305. At 306 the system determines if assembly tools are interfaced to the system for the particular assembly identified. In some workstations, mistake-proofing integration may not be required because it may be a single task performed or the product may be designed in such a way to not allow a mistake to occur or progress beyond this position. At 307 if tools are interfaced, the system indicates such to the operator at the workstation terminal. The assembly program for the particular assembly identified in the PLC triggers appropriate ladder logic at 308. At step 309 the PLC activates the proper interfaces for parts indicators, orientation, tool usage inputs, bin sensors etc. as required. At 310 the operator begins work on the assembly according to the sequence displayed at the workstation terminal. Once the operator has completed all the necessary steps and the PLC has detected such, the PLC will send a message to the system at 311. At 312 the system determines whether all ranked assembly steps have been completed. If not, the system returns to step 304 and the sequence is repeated for the next ranked assembly sequence. When at 312 the system recognizes that all ranked assembly sequences have been completed, the system at 313 sends a message to the PLC to release the assembly for position advance i.e. release electromechanical stops. The entire process is then repeated beginning at 301 for the next part. If at step 310 the operator determines that all steps have been completed but the PLC has not indicated such to the system the operator will attempt to send a "Next" message to the system at 314. At 315 the system will then check the PLC address to verify that all steps have been completed. If the PLC confirms that all steps are complete, a message is sent to the system at 316 to proceed to step 312. If at 315 the PLC indicates that work has not been completed properly a message is sent to the terminal indicating which steps are incomplete at 317. The sequence then begins again at 310. In the event that the operator has completed the work at step 310 but the PLC has not sent the message of 311, the operator may contact supervisory personnel at 318 to initiate an override of the system at 319. Returning now to step 306, the system determines whether tools are interfaced to the PLC for the particular assembly identified. If at this point the system determines that no tools are interfaced, the operator is notified of such at the terminal at step 320. The operator then performs the work at step 321 and sends a message to the system at step 322 indicating that work is complete. The system then sets to step 312.

Figure 4B:
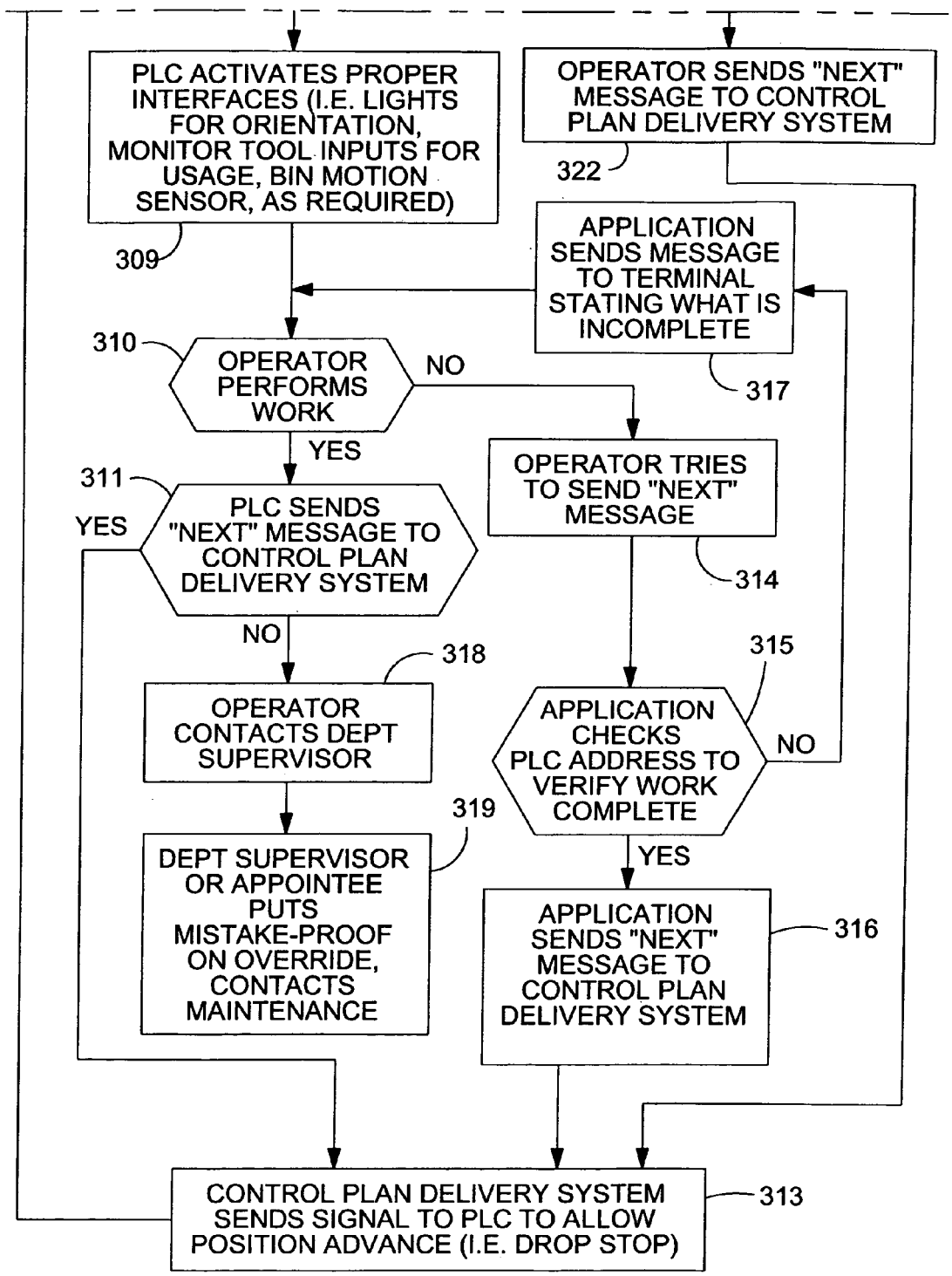
FIG. 4 is a flowchart showing the process for utilizing the invention in a non-sequential assembly process (work can be done in a random sequence of events)

With reference to FIG. 4 it will be seen that an assembly workstation non-sequential mistake-proofing process according to the invention is identical in many respects to the sequential process previously discussed, except that step 312 is not included in the non-sequential process of FIG. 4. More particularly, because there is no sequential ranking of steps it is not necessary to verify each step, instead it is only necessary to verify that all work is complete. Thus after the steps of 311, 316 and 322 the sequence steps to 313.

Figure 5:
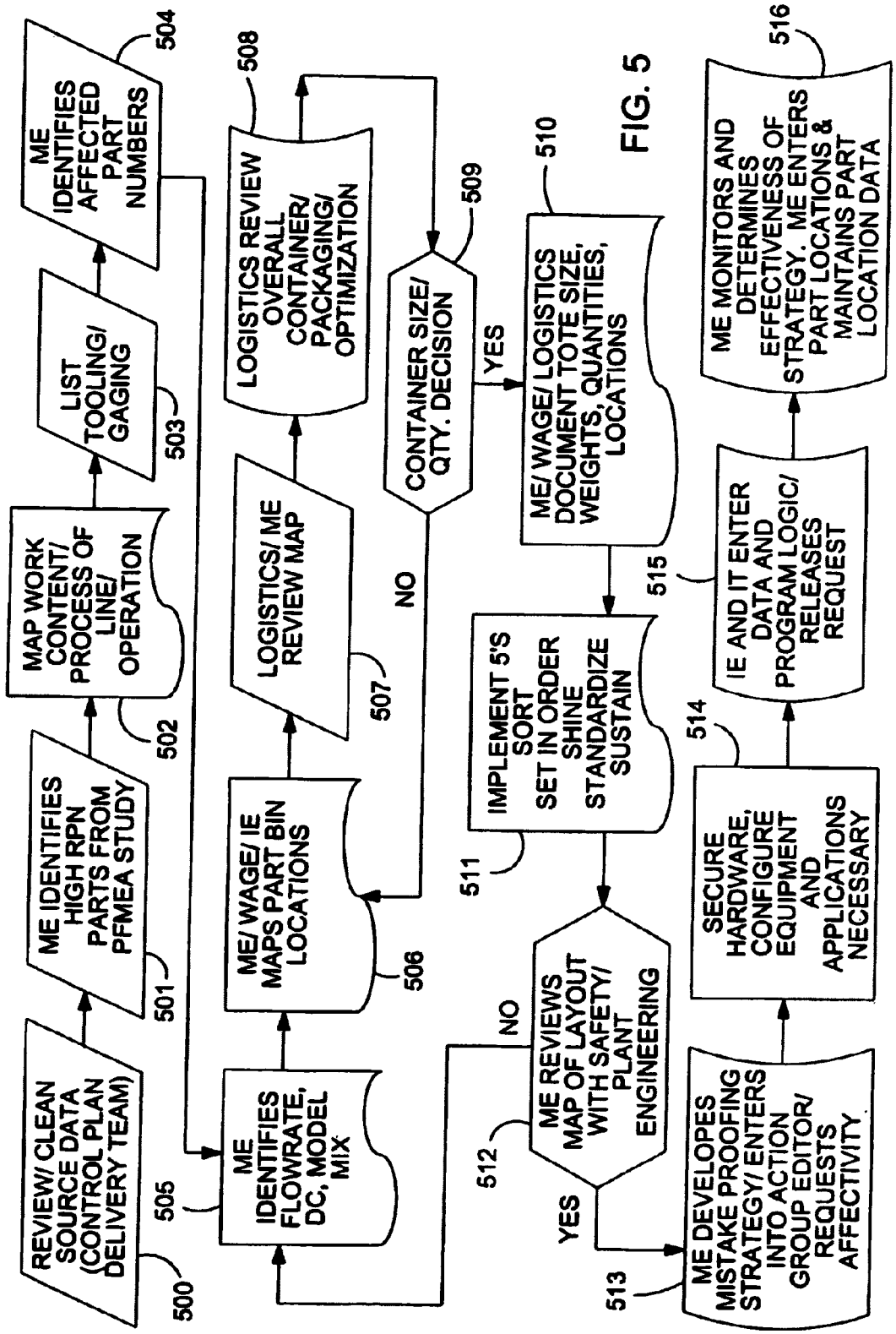
FIG. 5 is a flowchart that illustrates the mapping process for identifying and implementing the data of the invention.

With reference now to FIG. 5 it will be seen that the process for identifying, programming, and implementing the system with the appropriate mistake-proofing data is graphically illustrated. Beginning at 500 a Control Plan Delivery Team reviews and cleans all necessary source data. At 501 the Manufacturing Engineering personnel identify high RPN (Risk Priority Number) processes from appropriate PFMEA (Process Failure Mode and Effects Analysis) studies to be targeted for mistake proofing. Once the target processes have been identified a map is created at 502 of the work content for the particular line/operation in which the process is used. A list of necessary tooling and/or gaging is compiled at 503. The manufacturing engineer then identifies the affected part numbers at 504. At 505 the manufacturing engineer identifies the production flow rate, Dc (Design for Capacity) and the model mix for the particular workstation. The manufacturing engineer then correlates time study data with manufacturing engineering maps of parts bin locations, etc., at 506. At 507 logistics personnel and the manufacturing engineer review the map and at 508 the logistics personnel determine the overall packaging/container optimization for necessary materials. At 509 a decision is made, if necessary, relating to container size and/or quantity. The manufacturing engineer in conjunction with operator and logistics personnel determine tote size, weights, quantities and locations for all necessary parts at 510. At 511 a philosophy known as the "Five S's" is employed. For those unfamiliar with this philosophy, the first S is for Sort or ensure that all necessary components are available and in working order. The second S is for Set In Order or ensure that components are installed and placed in an efficient layout. The third S is for Shine or clean the work area for comfort, safety and efficiency. The fourth S is for Standardize or utilize uniform procedures throughout the process. Finally, the fifth S is for Sustain or maintain the configuration with the fewest changes possible. The Five S's philosophy ensures that the workstation is in the best possible condition before and after the mistake-proofing system is implemented. At 512 the manufacturing engineer reviews the proposed layout with safety and manufacturing engineering personnel. Once all necessary personnel approve a layout the manufacturing engineer enters the data into the part assignment interface and assigns effective date at 513. Manufacturing engineering personnel then identify and purchase the necessary hardware and configure the equipment to interface with the mistake-proofing system at 514. At 515 the integration engineering and information technology personnel enter the data into the part assignment PLC address interface and release the request for production. Manufacturing engineering personnel monitor the process to determine the effectiveness of the strategy and provides updates as necessary, while maintaining part location data at 516.

Figure 6B:
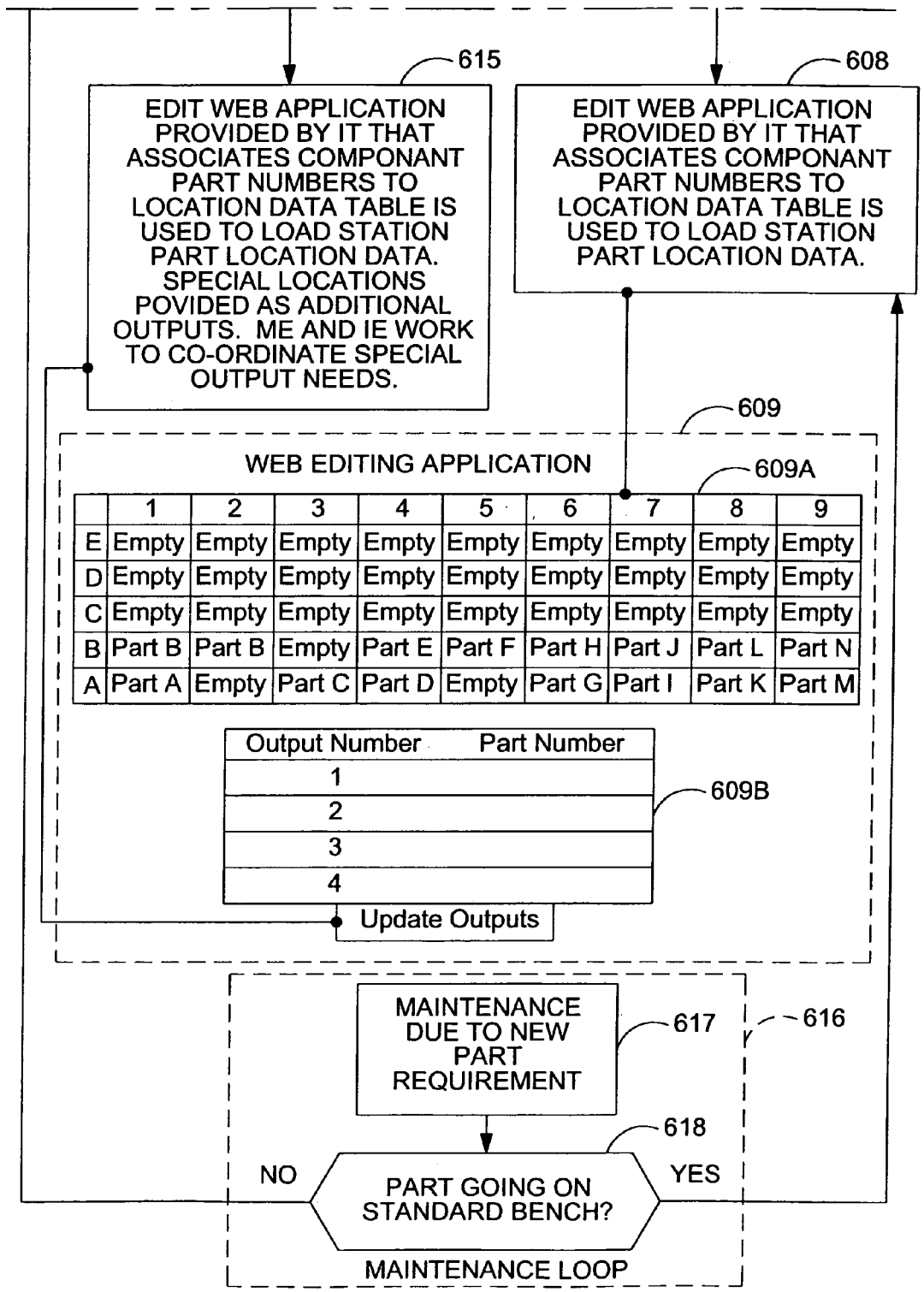
FIG. 6 is a flowchart that illustrates the mapping process for part location and indication assignment; and, FIG. 7 is a flowchart that illustrates the action group and action definition creation process.

FIG. 6 illustrates the process for part location and indication assignment mapping according to the invention. Once the work station layout has been approved at 601, the manufacturing engineering personnel determine at 602 whether the work station benches are arranged according to a-standard layout or if the layout is non-standard. If a standard bench layout is to be used, integration engineering (IE) personnel procure appropriate part indication light bars at 603. At 604 the IE personnel install the light bars to the appropriate part benches and wire them to the PLC or I/O card. PLC outputs are then programmed at 605 to light the appropriate part location. Memory address locations from 605 are stored in a Location Data Table provided by IT personnel at 606. The OPC server is then configured at 607 to identify Location Data Table address locations. The web editing application 609 provided by IT personnel to associate component part numbers with the Location Data Table is used at 608 to load station part location data. At 609 the web editing application is provided with a standard layout entry interface as shown for example at 609A. The standard layout of 609A has five rows and nine columns which correspond to bench locations defined to the PLC thus the application can be configured to recognize that a particular part or tool is located at a particular bench location by entering the part number into the proper cell on the application 609A. Returning now to step 602, if manufacturing engineering personnel determine that a non-standard bench layout is to be used, IE personnel procure special part indication light bars at 610. At 611 the IE personnel install the light bars to the appropriate part benches and wire them to the PLC or I/O card. PLC outputs are then programmed at 612 to light the appropriate part location. Memory address locations from 612 are stored in a Location Data Table provided by IT personnel at 613. The OPC server is then configured at 614 to identify Location Data Table address locations. The web editing application 609 which has been provided by IT personnel to associate component part numbers with the Location Data Table is used at 615 to load station part location data. Special locations are provided as additional outputs at 609B as determined by coordinated efforts of ME and IE personnel. Accordingly, a non-standard bench layout can be configured by defining special outputs in the web application of 609B. A maintenance loop is provided at 616 for updating the system. When at 617 it is determined to add a new part to the assembly process the determination must again be made whether a standard or non-standard bench layout will be employed at 618. If a standard layout is to be used the maintenance procedure then sets to step 608. If a non-standard layout is required then the process must proceed from step 610.

FIG. 7 illustrates the action group and action definition creation process, in which actions and action groups are defined and entered into the system. Specifically, at 701 ME personnel determine from appropriate PFMEA studies when and where mistake-proofing is required. It is then determined at 702 whether the required mistake-proofing strategy is new or if appropriate actions and action groups have already been defined. If it is determined that the mistake-proofing requirements are new, it must next be determined whether there are any similar existing strategies at 703. If at 703 the determination is that no similar mistake-proofing strategies exist then new actions are created as needed in the web application at 704 wherein functions and error messages are described. At 705 the actions defined at 704 are compiled into newly created action groups, functions are described and assembly numbers are assigned to the action groups. An effective date is requested at 706. At 707 IE personnel work with ME personnel to implement the necessary hardware, to develop PLC logic for the new actions and assign logic addresses for the new action groups. Address locations are stored in the Location Data Table at 708. At 709 the OPC server is configured to identify Location Data Table address locations. An enable date is set at 710. Returning now to step 703, if it is determined that a similar mistake-proofing strategy already exists the process moves to 711 where new actions are created as needed in the web application and functions and error messages are described. At 712 the actions defined at 711 are combined with existing actions and compiled into newly created action groups, functions are described and assembly numbers are assigned to the action groups. The process then moves to 706. At 702 if it is determined that no new mistake-proofing strategies are required i.e. appropriate action groups already exist, it is only necessary at 713 to assign new assembly numbers to the preexisting action groups and request an effective date at 714.

It should now be recognized that the mistake-proofing system of the present invention is a highly adaptable, infinitely variable holistic approach to the assembly process. By defining specific actions and then compiling action groups the process allows subsets of assembly information to be used in multiple model configurations wherein identical assembly steps are used. Accordingly, it is not necessary to redefine an action or action group when a step is to be reused or used in another model assembly, instead it is only necessary to program a pointer into the system to retrieve the action or action group data. Based upon the updated assembly information an operator can flawlessly transition from one model to another in a mixed model scenario by simply scanning a bar code that triggers the retrieval of all necessary assembly information. Changes to an assembly process are seamlessly integrated by making simple changes in the system without the need to retrain operators.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A process for identifying, programming, and implementing a system with appropriate mistake-proofing data comprising the steps of:
    reviewing and cleaning all necessary source data;
    identifying high RPN (Risk Priority Number) processes from appropriate PFMEA (Process Failure Mode and Effects Analysis) studies to be targeted for mistake proofing;
    creating a map of the work content for the particular line/operation in which the process is used;
    compiling a list of necessary tooling and/or gaging;
    identifying affected part numbers;
    identifying the production flow rate, and the model mix for the particular workstation;
    correlating time study data with parts bin locations;
    determining the overall packaging/container optimization for necessary materials;
    entering the data into a part assignment interface;
    identifying necessary hardware and configuring the hardware to interface with the mistake-proofing system;
    entering the data into the part assignment PLC address interface;
    monitoring the process to determine the effectiveness of the strategy and providing updates as necessary, while maintaining part location data.

* * * * *